United States Patent [19]

Wickersheim

[11] 4,075,493

[45] Feb. 21, 1978

[54] OPTICAL TEMPERATURE MEASUREMENT TECHNIQUE UTILIZING PHOSPHORS

[75] Inventor: Kenneth A. Wickersheim, Palo Alto, Calif.

[73] Assignee: Ronald Alves, Sunnyvale, Calif. ; a part interest

[21] Appl. No.: 751,366

[22] Filed: Dec. 16, 1976

[51] Int. Cl.$^2$ ............................................. G01N 21/38
[52] U.S. Cl. .............................. 250/461 R; 73/355 R
[58] Field of Search .................... 250/458, 459, 461 R; 73/355 R, 356

[56] References Cited

U.S. PATENT DOCUMENTS

| | | | |
|---|---|---|---|
| 2,071,471 | 2/1937 | Neubert | 250/461 X |
| 2,551,650 | 5/1951 | Urbach | 73/355 R X |
| 2,945,954 | 7/1960 | Gaugler | 250/459 |
| 3,256,518 | 6/1966 | Crane | 73/356 X |

Primary Examiner—Davis L. Willis
Attorney, Agent, or Firm—Limbach, Limbach & Sutton

[57] ABSTRACT

A technique wherein an object or environment to be measured is provided with a phosphor material layer that emits at least two optically isolatable wavelength ranges whose intensity ratio depends upon the object or environment temperature. This technique is applied to remote hostile environment point temperature measurements, such as in large enclosed electrical power transformers and other large equipment, to the measurement of surface temperatures, such as in airplane structures being tested in wind tunnels, and elsewhere.

23 Claims, 13 Drawing Figures

OPTICAL TEMPERATURE MEASUREMENT TECHNIQUE UTILIZING PHOSPHORS

BACKGROUND OF THE INVENTION

This invention relates generally to devices and methods for making temperature measurements, and more specifically to devices and methods that make such measurements by optical techniques that utilize temperature-sensitive phosphors.

There are many methods currently used for temperature measurement. The most common industrial techniques utilize thermocouples, thermistors or resistance thermometers by means of which electrical signals are generated and then converted into temperature readings or employed for control functions.

On occasion, however, it is useful, and sometimes essential, to obtain temperature data by non-electrical techniques. This may occur: (1) where temperatures over large areas are to be measured and measurement by a dense distribution of thermocouples thus becomes impractical; (2) where the attachment of thermocouples and leads would alter the temperatures to be measured; (3) in environments where, because of high electric or magnetic fields, metallic wires are undesirable; (4) where electrical isolation and/or insensitivity to electrical noise generation is desired; (5) where, because of motion or remoteness of the part to be sensed, permanent lead wires are impractical; or (6) where, because of corrosive chemical environments, wires and thermocouple junctions would be adversely affected, with resultant changes in electrical characteristics. In these situations, optical techniques frequently become preferable.

The most direct optical technique for temperature measurement is infrared radiometry. However, where line of sight measurement is not possible, without infrared transmission media, the infrared techniques suffer a disadvantage. In such an instance there are relatively few materials sufficiently transparent to long-wave infrared radiation to provide an infrared conducting path from the area where temperature is to be sensed to the infrared detector. Furthermore, infrared techniques are not absolute in that the emissivity of the emitting material has to be known accurately if the infrared radiometric measurements are to be converted into true temperature readings.

Optical pyrometers can also be used, but only for very hot sources which emit visible radiation. Optical pyrometers also suffer from the same problems as infrared radiometers when it comes to absolute measurements.

For large area measurements, thermographic phosphors or liquid crystals are sometimes employed in the form of films, paint or coatings applied to the surface to be measured. Known typical thermographic phosphors exhibit a broad fluorescence under ultraviolet excitation, this fluorescence being strongly temperature-dependent with regard to emission intensity. The fluorescent intensity of this emission "quenches" sharply as the temperature rises over a fairly narrow temperature range. It is difficult to calibrate a thermographic phospher absolutely because changes in excitation, such as might be caused by source instability, can be misinterpreted as a temperature variation. Liquid crystals change their reflected colors with temperature over a similarly narrow range. Both materials suffer from the fact that, to achieve high sensitivity, the range over which the materials will operate as temperature sensors is of necessity fairly restricted compared with the materials of this invention. Most liquid crystal materials are also relatively unstable and may change their chemical and physical properties over a period of time. While this is not always a problem, it can be in selected applications.

Therefore, it is a primary object of the present invention to provide techniques for remote temperature measurement using optical rather than electrical techniques that permit elimination of metallic wires, junctions and connectors, that circumvent electrical noise sources and that provide for measurement over extended areas as well as point measurements.

It is another object of the present invention to provide an internally calibrated phosphor temperature measuring system whereby changes in total fluorescent intensity with time as might be caused by a variation in excitation, changes in optical transmission with time or changes in sensitivity of a receiving detector with time are not interpreted as temperature changes.

It is yet another object of the present invention to provide a means of measuring temperatures of objects or environments without the necessity of direct physical contact with electrical wires, such as situations where the point to be measured is submerged in a corrosive gas or liquid, must be isolated electrically or thermally, is in a vacuum, or is located on a moving part to which permanent leads cannot be conveniently connected.

Finally, it is an object of the present invention to provide a means of making absolute, internally calibrated temperature measurements over wider temperature ranges than would be possible with conventional thermographic phosphors or liquid crystals.

SUMMARY OF THE INVENTION

These and additional objects are accomplished by the techniques of the present invention wherein, generally, an object or environment for which a temperature is to be measured is provided with a layer of phosphor material that when excited to luminescence emits detectable radiation within two or more distinct wavelength ranges that are optically isolatable from one another, with a relative intensity of emission in these wavelength ranges varying in a known manner as a function of the temperature of the phosphor. Such a phosphor material may be a single phosphor composition exhibiting such characteristics or may, alternatively, be two or more phosphor compositions in a physical mixture that together exhibit these characteristics. Sharp line emitting phosphors, such as those having rare earth activators, are preferred. A practical system of accurately measuring temperatures over wide ranges is thus made possible, a normal desired range of from $-100°$ C to $+400°$ C being achievable.

The intensity of two such lines of phosphor emission are detected and a ratio of the detected signals taken. The ratio is convertible into temperature is accordance with the known temperature characteristics of the phosphor material. This optical system is internally calibrated because the taking of a ratio makes the technique relatively insensitive to changes in total intensity of the phosphor emissions, general changes in optical transmission or changes in the sensitivity of the receiving detector which may occur in time. The technique is thus adapted for long term remote temperature measurement applications.

The use of this approach permits several specific temperature measurement improvements and solves heretofore unsolved temperature measuring problems. According to one more specific form of the invention, remote, non-contact temperature measurements can be made of large surface areas, such as those in models being tested in wind tunnels, by painting the phosphor over the surface areas to be monitored. The model is then illuminated by an appropriate exciting radiation and intensity measurements of the selected phosphor luminescent lines are taken of selected points on the model from outside of the wind tunnel. Heating of the model surface by a flow of air thereover is thus monitored.

According to another specific aspect of the invention, remote measurement of point temperatures are made possible. Temperatures deep inside an apparatus, for instance, are extremely difficult to measure, and heretofore have not been measured in environments where metallic wires cannot be used. One such environment is in large electrical power transformers that are sealed, filled with oil, operated at high temperatures and have high levels of electric and magnetic fields that will not tolerate insertion of any metallic parts of a more conventional temperature measurement system. According to the present invention, the phosphor material is formed internal to a small sensor on the end of a long fiber optic cable. The sensor is then immersed in the location of the transformer where a spot temperature measurement is needed. The phosphor is coupled to the detector by means of the fiber optic cable with the measurements of the phosphor luminescence being made outside of the apparatus.

The present invention has been described only very generally. Additional objects, advantages and features thereof are set forth as part of the following description of the preferred embodiments of the various aspects of the present invention, which should be taken in conjunction with the accompanying drawings.

DESCRIPTION OF THE PREFERRED EMBODIMENTS

Figure 1:
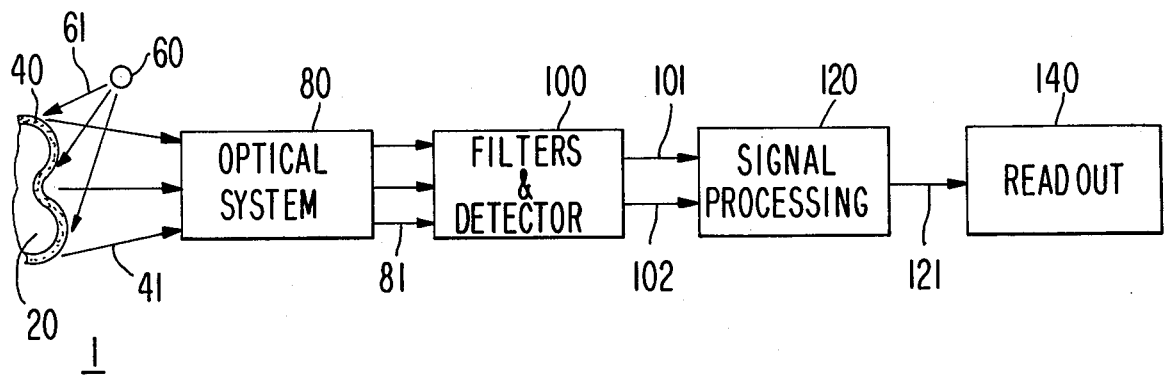
FIG. 1 is a block diagram illustrating in general the basic aspects of the present invention.

Referring to FIG. 1, the basic features of all of the various aspects of the present invention are illustrated. Within some environment 1 is positioned a solid object 20 having a phosphor coating 40 over at least a portion thereof. The phosphor is characterized by emitting, when excited, electromagnetic radiation within separable bandwidths at two or more distinct wavelengths and with relative intensities in those bands that vary as a known function of the temperature of the phosphor 40. Thus, the temperature of the phosphor 40 is detected that is the same as or related to that of the object 20, and in some applications of the environment 1 as well.

Such luminescent emission of the phosphor 40 in the form of electromagnetic radiation 41, generally in or near the visible spectrum, is excited by a source 60 over a path 61. The source could be radioactive material, a source of cathode rays, an ultraviolet electromagnetic energy source, or any other remote source producing efficient fluorescence depending upon the particular type of phosphor utilized in the preferred forms of the present invention. The relative intensities of two distinct wavelength bands within the emitted radiation 41 contains the desired temperature information.

The emitted radiation 41 is gathered by an optical system 80 and directed in a form 81 onto an optical filter and radiation detector block 100. The block 100 contains filters to isolate each of the two bands or lines of interest within the radiation 81 that contain the temperature information. After isolation, the intensity of each of these bands or lines is detected which results in two separate electrical signals in lines 101 and 102, one signal proportional to the intensity of the radiation in one of the two bands and the other signal proportional to the intensity of the radiation in the other of the two bands of interest.

These electrical signals are then applied to an electronic signal processing circuit 120. In a preferred form, the signal processing circuits 120 take a ratio of the signals in the lines 101 and 102 by the use of routinely available circuitry. This electronic ratio signal is then applied to a signal processor within the block 120. The signal processor is an analog or digital device which contains the relationship of the ratio of the two line intensities as a function of temperature for the particular phosphor 40 utilized. This function is obtained by calibration data for the particular phosphor 40. The output of the signal processor in a line 121 is thence representative of the temperature of the phosphor 40.

The signal in the line 121 is applied to a read out device 140 which displays the temperature of the phosphor 40. The device 140 could be any one of a number of known read out devices, such as a digital or analog display of the temperature over some defined range. The device 140 could even be as elaborate as a color encoded television picture wherein each color represents a narrow temperature range on the object. It could also be a television picture stored on disc or tape.

PREFERRED PHOPSHOR MATERIALS AND CHARACTERISTICS

The fundamental characteristics of a phosphor material for use in the present invention is that when properly excited it emits radiation in at least two different wavelength ranges that are optically isolatable from one another, and further that the intensity variations of the radiation within each of these at least two wavelength ranges as a function of the phosphor temperature are known and different from one another. A phosphor material is preferred that is further characterized by its radiation emission in each of these at least two wavelength bands being sharp lines that rise from substantially zero emission on either side to a maximum line intensity, all in less than 100 angstroms. The lines are easy to isolate and have their own defined bandwidth.

For a practical temperature measuring device, the phosphor material selected should also emit radiation in the visible or near visible region of the spectrum since this is the easiest radiation to detect with available detectors, and since radiation in this region is readily transmitted by glass or quartz windows, fibers, lenses, etc. It is also desirable that the phosphor material selected be an efficient emitter of such radiation in response to some useful and practical form of excitation of the phosphor material. The particular phosphor material or mixture of phosphor materials is also desirably chosen so that the relative change of intensity of emission of radiation within the two wavelength ranges is a maximum within the temperature range to be measured. The phosphor material should also be durable, stable and be capable of reproducing essentially the same results from batch to batch. In the case of fiber optic transmission of the phosphor emission, as described in specific embodiments hereinafter, a sharp line emitting phosphor is desirably selected with the lines having wavelengths near one another so that any wavelength dependent attenuation of the fiber optic will not significantly affect the measured results at a position remote from the phosphor, thereby eliminating or reducing the necessity for intensity compensation that might be necessary if fibers of varying lengths were used.

The composition of a phosphor material capable of providing the characteristics outlined above may be represented very generally by the generic chemical compound description $A_xB_yC_z$, wherein A represents one or more cations, B represents one or more anions, together forming an appropriate non-metallic host compound, and C represents one or more activator elements that are compatable with the host material. $x$ and $y$ are small integers and $z$ is typically in the range of a few hundredths or less. Since the activator element is principally responsible for the emission characteristics of the phosphor with respect to wavelength bands and temperature dependence of emission therein, it is the selection of the activator element(s) of a phosphor compound that will principally determine whether the phosphor is appropriate for use in carrying out the present invention. The choice of the host compound will also have secondary effects on the detailed spectrun emitted, excitation efficiency, material characteristics such as transmission and durability, etc. There are a large number of known existing phosphor compounds from which those satisfying the fundamental characteristics discussed above may be selected by a trial and error process. A preferred group of elements from which the activator element C is chosen is any of the rare earth elements having an unfilled f-electron shell, all of which have sharp isolatable radiation line emissions of 10 angstroms bandwidth or less. Certain of these rare earth elements having comparatively strong visible or near visible emission are preferred for convenience of detecting, and they are typically in the trivalent form: praseodymium (Pr), samarium (Sm), europium (Eu), terbium (Tb), dysprosium (Dy), holmium (Ho), erbium (Er) and thulium (Tm). Other non-rare earth activators having a characteristic of sharp line emission which might be potentially useful in the present invention would include uranium (U) and chromium ($Cr^{3+}$). The activator element is combined with a compatable host material with a concentration of something less than 10 atom percent relative to the other cations present, and more usually less than 1 atom percent, depending on the particular activator elements and host compounds chosen.

A specific class of compositions which might be included in the phosphor layer 40 is a rare earth phosphor having the composition $(RE)_2O_2S:X$, wherein RE is one element selected from the group consisting of lanthanum (La), gadolinium (Gd) and yttrium (Y), and X is one doping element selected from the group of rare earth elements listed in the preceeding paragraph having a concentration in the range of 0.01 to 10.0 atom percent as a substitute for the RE element. A more usual portion of that concentration range will be less than 1.0 atom percent and in some cases less than 0.1 atom percent. The concentration is selected for the particular emission characteristics desired for a given application. As will be noted below, europium ($Eu^{3+}$) could be used alone in the above noted hosts to provide the desired optical and thermal characteristics whereas the other activators mentioned above would in all likelihood be used singly as activators and then physical mixtures of two or more such resultant phosphor compounds would be prepared to produce a phosphor material having the desired optical and thermal characteristics.

Such a phosphor compound may be suspended in a nitrocellulose binder for application in environments having temperatures of less than about 120° F, and in a silicate binder for higher temperature applications.

Figure 2:
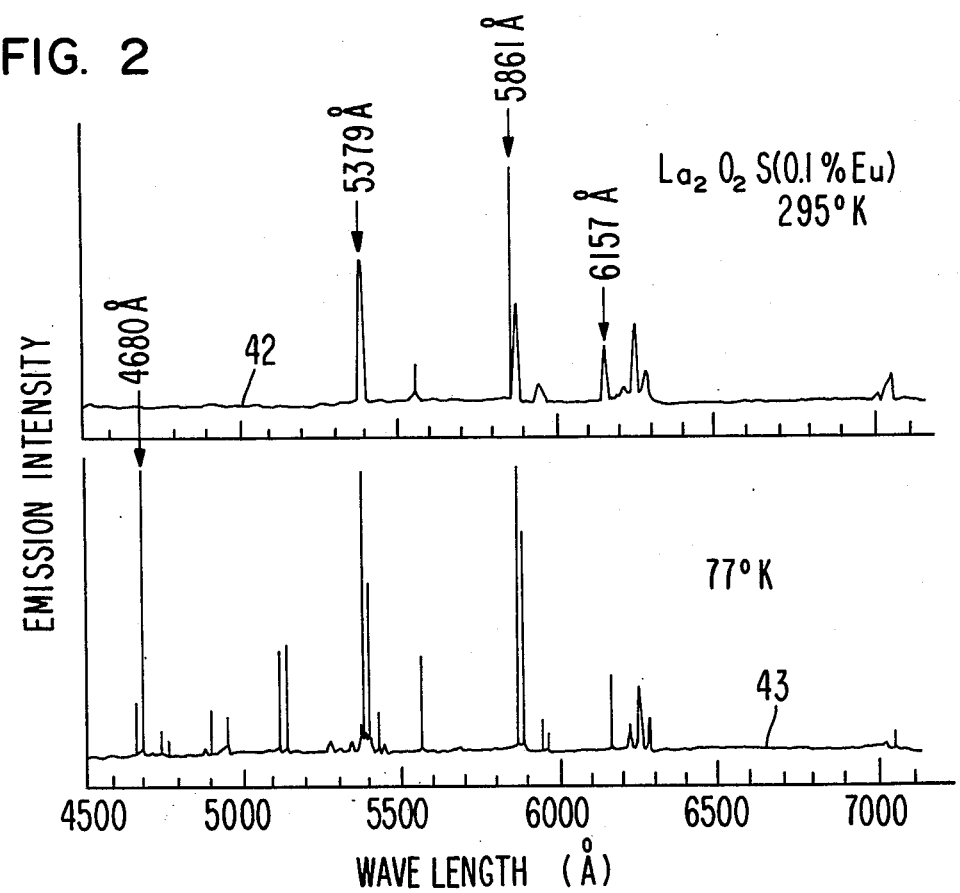
FIG. 2 are curves that illustrates the fluorescent emission spectrum at two different temperatures of europium-doped lanthanum oxysulfide phosphor when excited by ultraviolet radiation.

A specific example of such a material for the phosphor layer 40 of FIG. 1 that is very good for many applications is europium-doped lanthanum oxysulfide ($La_2O_2S:Eu$) where europium is present in the range of one atom percent down to 0.1 atom percent as a substitute for lanthanum. The curves 42 and 43 of FIG. 2 provide, for two separate phosphor temperatures, the intensity of its emission as a function of wavelength. The phosphor was in the form of a finely crystalline powder and was excited by electrons. The emitted radiation was analyzed with a scanning monochromator followed by a photo-multiplier detector. The particular material for which FIG. 2 illustrates the fluorescent emission spectrum is lanthanum oxysulfide with 0.1 atom percent of europium substituted for lanthanum.

Curve 42 of FIG. 2 shows the emission spectra of such a material at 295° K which is room temperature. The curve 43 of FIG. 2 shows the emission spectra for the material at 77° K, the extremely cold temperature of liquid nitrogen. It will be noted that the spectral characteristics of the emission are much different at these two temperatures and these changes continue to occur as the phosphor is raised above room temperature.

Narrow wavelength fluorescent lines which are particularly useful for temperature measurement, as marked on the curves of FIG. 2, are located at approximately 4680 angstroms, 5379 angstroms, 5861 angstroms (actually a doublet) and 6157 angstroms. The relative intensities of these lines change as a function of temperature of the phosphor and it is these relative intensities that give the temperature information in the various forms of the present invention.

Figure 3:
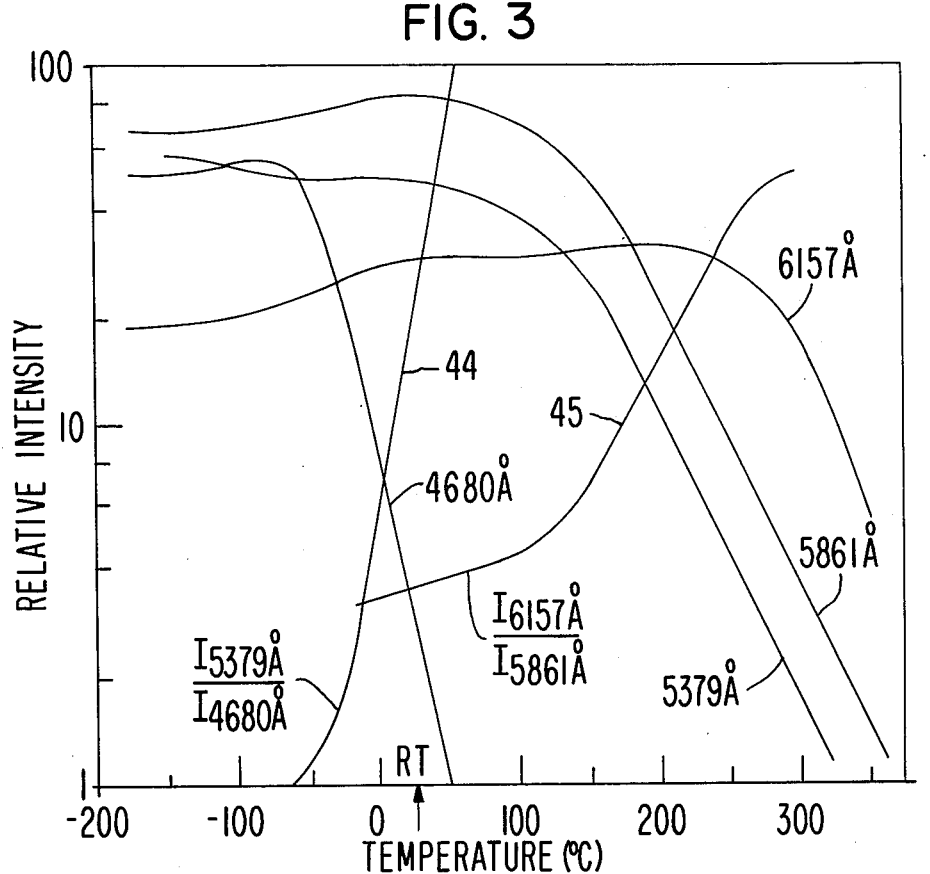
FIG. 3 are curves that illustrate the intensity of specific strong emission lines from a europium-doped lanthanum oxysulfide phosphor when excited by ultraviolet radiation.

The relative intensities of at least two of suitable narrow bandwidth spectral lines are determined, in the preferred forms of the invention, by taking the ratio of the detected intensities of two of the lines. The two lines must thus be non-overlapping and separated enough in wavelength so that their intensities may be measured independently. Referring to FIG. 3, the intensities of the four spectral lines identified on FIG. 2 are drawn as a function of temperature of the phosphor. Additionally, curve 44 of FIG. 3 shows a ratio of the two spectral lines at 5379 angstroms and 4680 angstroms as a function of temperature. It is such a characteristic as illustrated by the curve 44 that permits accurate, pre-calibrated temperature measurement by taking a ratio of two spectral lines. Similarly, if the other two lines at 6157 angstroms and 5861 angstroms are ratioed, the characteristic of the resulting ratio as a function of temperature is given in curve 45. As can be seen from FIG. 3, the ratio represented by the curve 44 varies strongly within a temperature range from $-75°$ C to $+50°$ C. The second ratio indicated by the curve 45, on the other hand, varies strongly with temperature over the range of from about 50° C to 300° C. Therefore, the particular fluorescent emission spectral lines of the phosphor that are utilized depend upon the expected temperature range to be monitored.

In order to adequately detect and measure these spectral line ratios without interference from adjacent emission lines, the fluorescent radiation 41 and 81 of FIG. 1 must first be passed, as part of the block 100, through an optical filter such as a monochromator or interference filter set chosen to isolate the selected wavelength ranges in which the spectral lines of interest fall. It can be seen from the characteristics of the phosphor illustrated in FIG. 2 that for the 4680 angstrom, 5861 angstrom and 6157 angstrom lines, a bandpass filter in the order of 50 angstroms wide is adequate for separation. In addition to separation, it may also be desirable to correct the measured lines intensities within the block 100 for any strong background radiation which may be present, such as that from room light or day light. For that purpose, it may be desirable in certain circumstances to additionally measure the intensity of radiation as seen through the utilized monochromator or filter when tuned to a spectral region near the fluorescent lines but where no fluorescent radiation is expected. An example using the phosphor whose characteristics are illustrated in FIG. 2 is in the region of from 6000 to 6100 angstroms. Alernatively, the background can be determined by turning off the excitation source and looking through the two filters. Any background radiation so measured can then be subtracted from the 5861 and 6157 angstrom line intensities that are measured to yield a more correct ratio for temperature measurement purposes.

A physical mixture of phosphor compounds can also be utilized, as an alternative, in order to obtain desired temperature characteristics. The intensity of one emission line from one compound of the mixture, for instance, can be compared with the line intensity of another compound in order to provide optimum measuring characteristics over a given temperature range. Alternatively, two emission lines from each of two phosphor compositions can be utilized, the lines from one compound compared over one temperature range and the lines from the other compound being compared over an adjacent temperature range. For example, a terbium doped lanthanum, gadolinium or yttrium oxysulfide may be used as one compound in combination with an europium-doped lanthanum, gadolinium or yttrium oxysulfide as the other compound.

The phosphor materials mentioned above have an advantage of being relatively inert and stable. The emission lines of the phosphor are in the visible or near visible region and thus transmission through long air paths, through water and other liquids, or through long optical fibers, or through glass or quartz optics, is possible. Such a phosphor differs from more conventional phosphors in that it emits very sharp line output spectra that can be readily optically isolated from each other, and the temperature dependence of line intensities at a particular wavelength is very strong relative to that at other wavelengths over a given temperature range of practical interest. Other phosphor materials having these characteristics can be utilized as part of the technique and structure of the various aspects of the present invention, as well.

REMOTE NON-CONTACT SURFACE TEMPERATURE MEASUREMENTS

Figure 4:
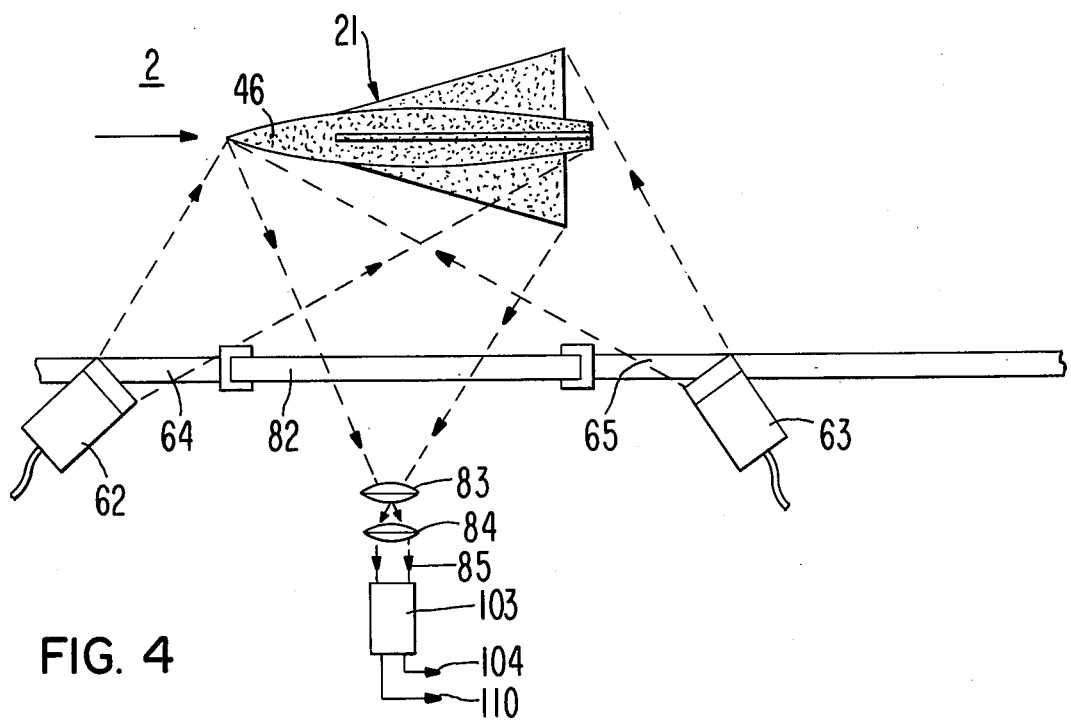
FIG. 4 schematically illustrates one specific form of the present invention wherein the temperature of the surface of a wind tunnel model is remotely measured.

Referring to FIG. 4, an object 21 within an environment 2 has its outside surface painted with phosphor material 46. By monitoring the emission of the phosphor, when properly excited, the surface temperature of the object 21 can be monitored from a remote distance and without contacting the object 21.

In the particular example shown in FIG. 4, the object 21 is an aerodynamic model positioned in an environment 2 that is a test wind tunnel. The surface temperature being monitored on the model 21 provides information as to the effect of the air flow in heating the model surface.

The phosphor painted on the surface of the model 21 is excited to luminescence by illumination from ultraviolet lamps 62 and 63. In some situations, an ultraviolet laser might be used as well, particularly for measurement of selected object points. The ultraviolet output of the lamps 62 and 63 are passed, respectively, through windows 64 and 65 that are transparent to ultraviolet energy so that it might pass into the wind tunnel 2 and onto the model 21. Another window 82 permits emitted radiation from the phosphor on the surface of the model 21 to be gathered by an optical system, represented by lenses 83 and 84. The collected radiation 85 is then directed onto a filter and detector system 103. The filter and detector 103 is similar to the filter and detector 100 previously described with respect to FIG. 1.

Figure 5:
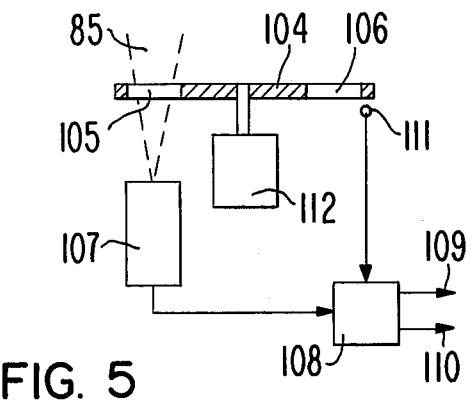
FIG. 5 shows one specific form of an optical detector 103 of the temperature measuring system of FIG. 4.

Referring to FIG. 5, details of one form of the filter and detector 103 are illustrated. A filter wheel 104 is positioned in the path of the radiation 85 from the phosphor. The wheel 104 has at least two different filters 105 and 106 spaced on different areas of the wheel 104 so that as it is rotated by the motor 112 the filters 105 and 106 are alternatively passed through the beam 85. The filters 105 and 106 are designed to be narrow bandpass filters to select out two different spectral lines of the phosphor being utilized.

The two selected phosphor emission lines are thus applied in time sequence to a detector 107 whose output is applied to an electronic circuit 108. The detector could be a photomultiplier or a silicon photo-diode which would give only an average of the intensity of the particular selected lines over the entire object 21 or the detector 107 could be some other device, such as an image dissector or a television camera, that would convert the optical image of the object 21 as viewed by the selected emission lines into a two dimensional intensity plot. The use of the latter type detectors has an advantage of permitting temperature detection on each point of the object 21 separately. The electronics 108 receives a synchronous signal from the detector 111 which tells it which of the two filters 105 and 106 are in front of the detector 107 at any instant. This permits the electronics 108 to develop the two signals 109 and 110 representative, respectively, of the intensities of the two selected emission lines of the phosphor.

Figure 6:
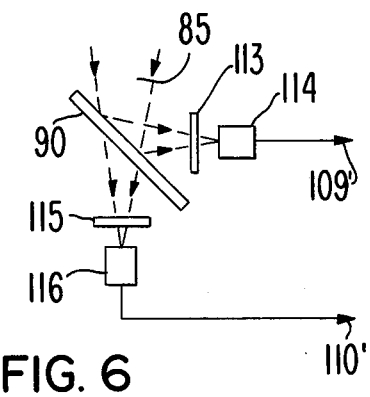
FIG. 6 shows another specific form of an optical detector 103 of the temperature measurement system of FIG. 4.

FIG. 6 shows another form of the filter and detector 103 of FIG. 4. In the form of FIG. 6, a beam splitter or dichroic mirror 90 is positioned in the path of the phosphor fluorescent emission beam 85 so that known fractions of the intensity of the beam goes in each of two directions. One direction is through a filter 115 and onto a single detector 116 to develop an electrical signal 110'. The other path is through a filter 113 onto a second detector 114 to develop a signal 109'. Each of the filters 113 and 115 are selected to permit one or the other of two selected emission spectral lines to pass therethrough and onto their respective detectors. The output signals in the lines 109 and 110 of FIGS. 4 and 5, and 109' and 110' of FIG. 6, are applied to appropriate signal processing and readout circuits as described with respect to blocks 120 and 140 of FIG. 1. The read-out device would depend, of course, upon the type of detector used, being a television display system or video storage medium if the detector 107 is a television camera.

REMOTE POINT TEMPERATURE MEASUREMENT

There are many applications of large machinery and apparatus wherein it is desired to monitor the temperature at one or more points within the apparatus while it is operating. Large machinery is especially expensive. It is very inconvenient and expensive when it breaks down due to local overheating. If such local overheating can be detected before any damage is done, then the cause of it can be determined, thus avoiding more costly shutdowns of the equipment. Monitoring the overall or average temperature of the equipment, by monitoring the temperature of water or oil coolant, for instance, does not provide the necessary information in most instances because the overheating could be raising the temperature of a small part of the machinery to an excessive and damaging level without raising the average temperature any detectable amount.

One such piece of equipment wherein there has been a long need for such point temperature measurement is in large electrical power transformers, some of which are capable of handling several megawatts of electrical power. Destruction of such a large piece of equipment is not only extremely costly but can significantly disrupt a large portion of an electric power company's distribution system. The problem has not been satisfactorily solved before since electrical transformers, as is the case with other high voltage electrical equipment, cannot tolerate any electrical conductors within the equipment that will disturb the electric and magnetic fields or cause a potential for short circuits. Therefore, there is a need for a non-metallic local point temperature sensor that can be used inside of electrical power transformers or other types of large electrical equipment.

Figure 7:
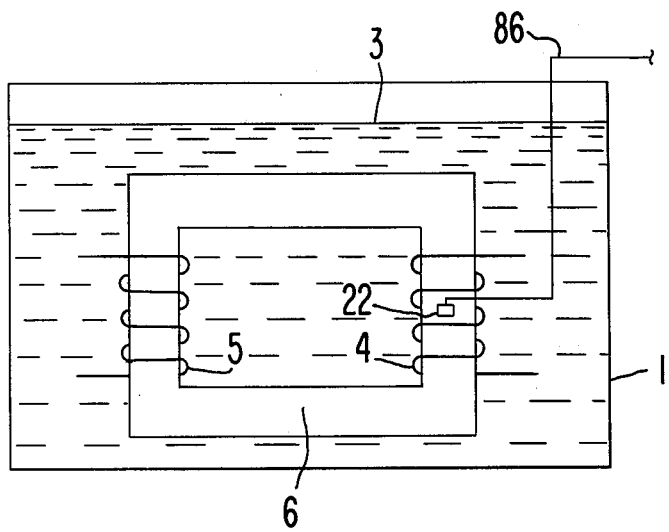
FIG. 7 schematically illustrates a large electrical power transformer utilizing one aspect of the present invention for remotely measuring spot temperatures thereof.

Referring to FIG. 7, such a transformer is very generally illustrated. A thick steel outer shell 7 contains a transformer core 6 having windings 4 and 5 therearound. The entire core and windings are submersed in an oil bath 3 for insulation and cooling. In order to monitor the temperature of a given spot on the interior of such a transformer, a single sensor 22 is provided in accordance with another aspect of the present invention. The sensor 22 is connected to one end of a long optical fiber bundle 86. The sensor 22 may be constructed without any metal parts at all and is optically connected by the fiber bundle 86 to an appropriate filter and detector system 100', an electric signal processing circuit 120' and a direct temperature read-out device 140'.

Figure 8:
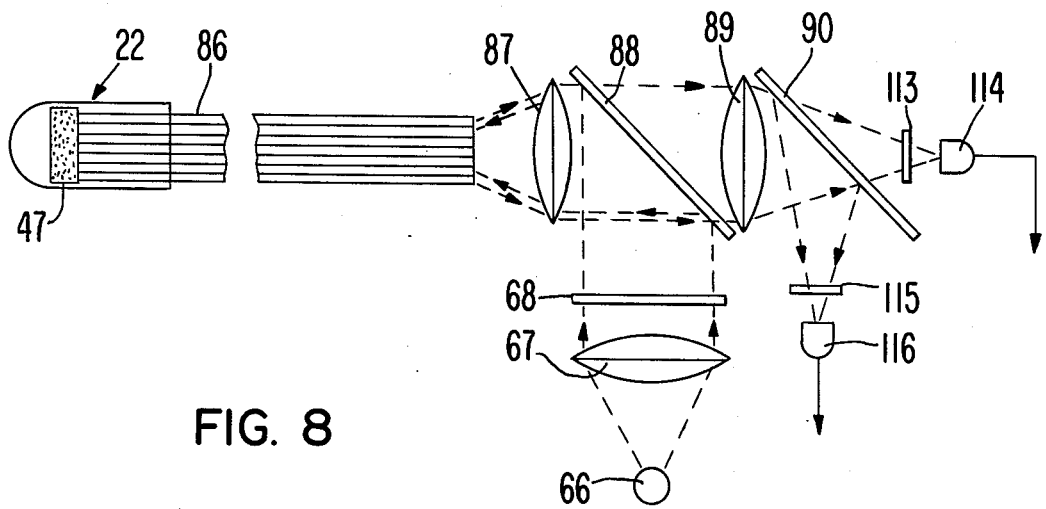
FIG. 8 shows a phosphor temperature sensor and optical system therefor as one form of the temperature measurement system of FIG. 7.

Referring to FIG. 8, the temperature sensor 22 is shown in cross section wherein it contains a phosphor material 87 in optical communication with one end of the optical fiber bundle 86. This end of the optical fibers and the phosphor are all sealed together by an appropriate glass or ceramic material to form a probe which may be inserted into a transformer or other machinery. The probe is subjected to the temperature to be measured and the phosphor, being part of that probe, responds as described hereinbefore with relative changes in the intensity of its spectral output lines as a function of temperature.

The output of the phosphor 47 is obtained at an opposite end of the fiber bundle 86 by a lens 87 which directs the emission radiation through a beam splitter or dichroic mirror 88, through another lens 89, and thence to a system already described with respect to FIG. 6, including a beam splitter or dichroic mirror 90, two filters 113 and 115 and two radiation detectors 114 and 116.

In order to excite the phosphor 47 to emit the desired lines, the embodiment of FIG. 8 employs an ultraviolet light source 66 whose output is directed by a lens 67, passed through a broadband ultraviolet filter 68 which blocks all but the ultraviolet light and then onto the beam splitter or dichroic mirror 88. The element 88 is designed to transmit visible light but reflect ultraviolet light so that the optical configuration shown in FIG. 8 utilizes such a characteristic to advantage. The ultraviolet radiation is reflected by the element 88, directed through the lens 87 into the optical fiber bundle 86 and transmitted through it to the phosphor material 47 to excite its luminescent emission which provides the temperature information in a coded form, as described above.

Figure 9:
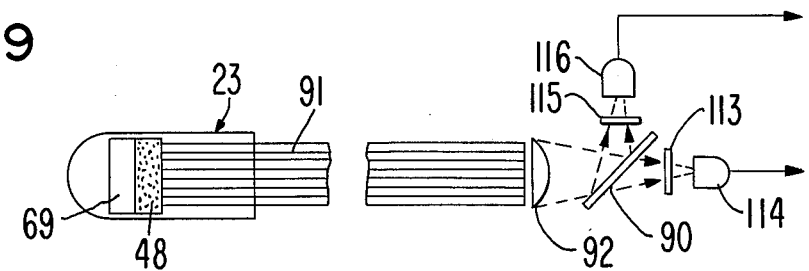
FIG. 9 shows a variation in the temperature measurement system of FIG. 8.

FIG. 9 shows a variation of the probe and detecting system of FIG. 8 wherein a probe 23 includes a phosphor material 48 attached to one end of an optical fiber bundle 91. Encapsulated within the probe 23 in this embodiment is a radioactive material 69 which is selected to excite, for a number of years, the phosphor material 48. The emission of the phosphor material 48 is transmitted through the optical fiber bundle 91, through a lens 92 and onto a beam splitter, filter and detector system as described previously with respect to FIGS. 6 and 8. The radioactive material 69, used in place of the ultraviolet source 66 of FIG. 8, may be, for example, an isotope of nickel, such as $_{63}$Ni, having a half life of 92 years. This material emits electrons but does not emit gamma rays. This probe 23 and communicating optical fiber bundle 91 still may maintain the desirable characteristic of having no metallic component if the $_{63}$Ni is in the form of an oxide or other non-metallic compound.

Figure 10:
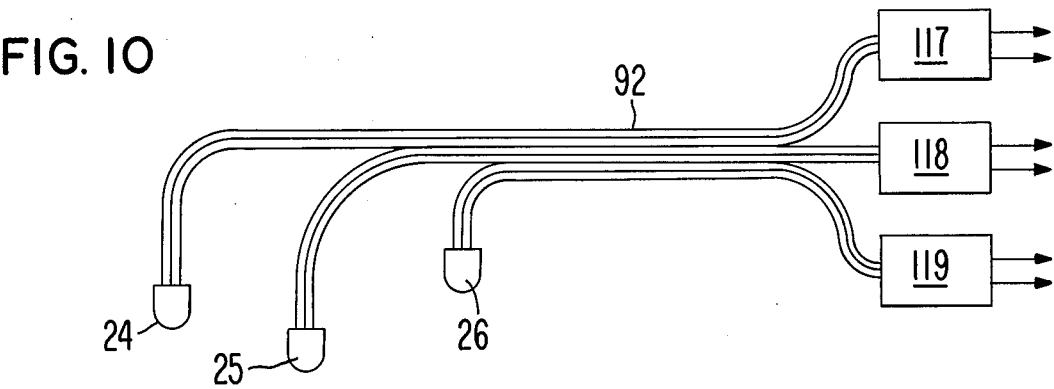
FIG. 10 shows yet another variation of the temperature measurement system of FIG. 8.

FIG. 10 shows a variation of either of the probe assemblies of FIGS. 8 and 9 wherein a single optical fiber bundle 92 provides optical communication with a plurality of separate probes, such as the probes 24, 25 and 26, which can be positioned at different locations within a power transformer or other apparatus. At one end of the optical fiber bundle 92, a few of the fibers are connected with each of the individual probes 24, 25 and 26. At the opposite end of the fiber bundle 92, the opposite ends of the same optical fibers are connected to individual filters and detectors. That is, the probe 24 is in optical communication with only the filter and detector block 117, the probe 25 only with the filter and detector block 118, and so forth. Alternatively, the separate probes can be scanned at the output end of the fiber optic bundle by a single detector in a controlled and predetermined fashion.

Obviously, the specific types of equipment where such temperature probes have a high degree of utility are numerous. An electric power generating nuclear reactor is another place where the invention can be used with great advantage to measure temperature of remote, inaccessible positions.

OTHER APPLICATIONS

Figure 11:
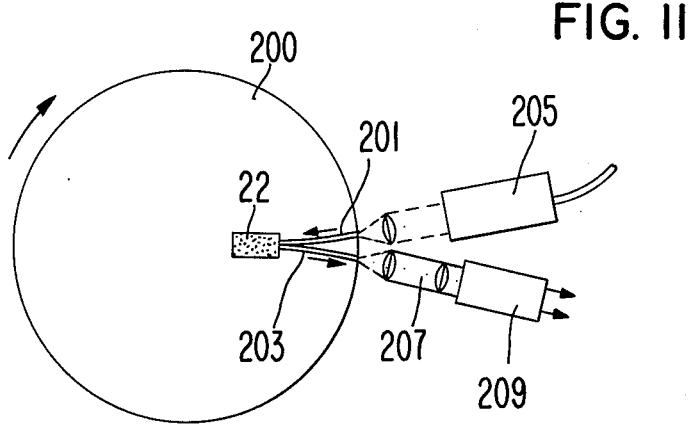
FIG. 11 illustrates a rotating device with its internal temperature being measured according to another aspect of the present invention.

The techniques of the present invention lend themselves to optical commutation. They may be applied without physical contact and are immune to electrical noise. A specific applicaton of optical commutation is on a rotating device 200 as shown in FIG. 11. This device could be a motor, turbine or generator. The phosphor containing probe 22 is embedded in the rotating part 200 as are an optical fiber input bundle 210 and an output bundle 203. The optical fiber bundles terminate at an external circumference of the wheel or rotating part 200. This permits the non-rotatable fixed positioning of an exciting radiation source, such as an ultraviolet source 205, and phosphor emission receiving optics 207 adjacent thereto. At one position, for a short instance, in each rotation of the rotating part 200, the ultraviolet source and the phosphor emission radiation optics 207 will be aligned with their respective optical fiber bundles 201 and 203. At that instant, the temperature of the part at the position of the embedded phosphor containing probe 22 is measured. The optical system 207 is connected with an appropriate filter and detector 209 of one of the types discussed with respect to other of the embodiments above.

Figure 12:
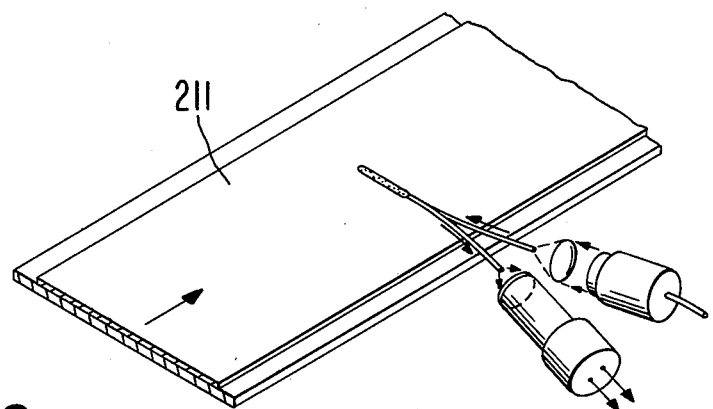
FIG. 12 illustrates a moving belt with its temperature being measured according to another aspect of the present invention.

The same technique can be utilized, as shown in FIG. 12, for a moving belt 211. This optical temperature measurement technique can be seen to have considerable advantages since no physical connection of wires or other devices are required between the moving part and the fixed measuring equipment. As an alternative to the particular optical technique shown in FIGS. 11 and 12, the rotating part 200 and the belt 211 could also be painted with a phosphor paint as discussed with respect to FIG. 4.

Figure 13:
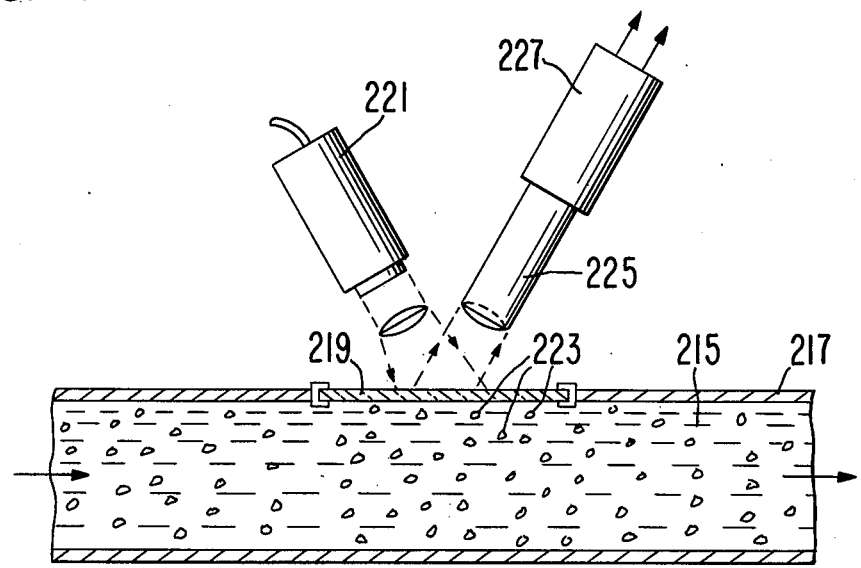
FIG. 13 illustrates another aspect of the present invention wherein the temperature of fluid flow is measured.

Referring to FIG. 13, yet another application of the basic concept of the present invention is shown wherein the temperature of a moving stream of fluid 215 passing through a pipe 217. A window 219 is provided in the wall of the pipe 217 and characterized by transmitting ultraviolet and visible radiation without significant attenuation. An electromagnetic energy source 221 in the ultraviolet spectrum illuminates the interior of the pipe through the window 219. The fluid stream 215 is provided with a plurality of phosphor coated particles 223 that have a size and density consistent with the type of fluid 215 and flow to be expected so that they remain distributed within the fluid stream 215. The radiation from the ultraviolet source 221 causes the phosphor coating on the particles 223 to luminesce and this luminescence is gathered by an optical system 225 which collects and transmits the phosphor radiation to an appropriate detector 227. By detecting and ratioing the intensities of two phosphor emission lines of interest, the temperature of the fluid stream 215 is determined since the particles have been given a chance to reach a temperature equilibrium with that of the fluid stream 215.

Other particular applications will become apparent from this description. The probe and optical fiber embodiment can be applied to point temperature measurement in humans and animals, for example.

The technique can also be broadly applied to imaging thermography wherein an object scene is imaged onto a phosphor screen and the emissions detected through filters by a television camera to measure the relative intensity of two emission lines and thence the temperature of the image, the latter being proportional to the temperature of the object scene. In yet another approach to thermal imaging, the phosphor screen could be mounted within a vacuum tube, illuminated from one side by the thermal image, via a suitable infrared-transmitting window and substrate, and excited from the other side by an electron beam scanned in raster fashion. In this instance the thermal image could be reconstructed using a single pair of optical point detectors suitably filtered with the resultant line intensity ratio thence used to modulate the intensity of the electron beam of a cathode ray display tube which is also scanned in raster fashion in synchronism with the exciting electron beam.

Although the various aspects of the present invention have been described with respect to a preferred embodiment thereof, it will be understood that the invention is entitled to protection within the full scope of the appended claims.

I claim:
1. A method of determining the temperature of an object, comprising the steps of:
   positioning a layer of phosphor material in a heat conductive relationship with said object, said phosphor being characterized by emitting, when excited, electromagnetic radiation within optically isolatable bandwidths at at least two distinct wavelength ranges and with relative intensities therein that vary as a known function of the phosphor temperature,
   exciting said phosphor to cause emission of said at least two wavelength bands,
   optically directing said phosphor emission to a detecting position, and
   detecting the relative intensities of said at least two distinct wavelength bands, whereby said relative intensity is an indication of the temperature of the phosphor layer and related thereto by said known temperature emission function.
2. A method as defined by claim 1 wherein the step of positioning a layer of phosphor material comprises the step of coating said phosphor material directly on the surface of said object.

3. A method as defined by claim 1 wherein the step of optically directing said phosphor emission to a detecting station comprises imaging the excited phosphor onto said detecting station, and further wherein the step of detecting the relative intensity of said at least two distinct wavelength radiation bands comprises detecting selected points of said image.

4. A method as defined by claim 1 wherein the step of optically directing said phosphor emission to a detecting station comprises imaging the excited phosphor onto said detecting station, and further wherein the step of detecting the relative intensity of said at least two distinct wavelength radiation bands comprises the step of averaging substantially all of said image intensity by directing it onto a single detector.

5. A method as defined by claim 4 wherein the step of positioning a layer of phosphor material additionally comprises the step of positioning therein a phosphor composition $(RE)_2O_2S:X$ wherein RE is an element selected from the group consisting of lanthanum, gadolinium and yttrium, and wherein X is a doping element with a concentration of from 0.01 to 1.0 atom percent and is selected from the group consisting of europium, terbium, praseodymium, samarium, dysprosium, holmium, erbium and thulium.

6. A method as defined by claim 1 wherein said object comprises a probe designed for immersion into an environment whose temperature is to be measured, and further wherein the step of optically directing said phosphor emission to a detecting station includes positioning between said phosphor and said detecting station a length of optical fiber.

7. A method as defined by claim 6 wherein the step of exciting said phosphor comprises the step of positioning adjacent to said layer of phosphor material a source of electrons or other radioactive emissions.

8. A method as defined by claim 1 wherein the step of exciting said phosphor comprises the step of directing electromagnetic energy against said phosphor.

9. A method as defined by claim 1 wherein the step of detecting the relative intensities of said at least two distinct wavelength radiation bands comprises the steps of detecting separately each of the relative intensities of said at least two distinct wavelength radiation bands, and taking the ratio of the detected intensities.

10. A method as defined by claim 1 wherein the step of positioning a layer of phosphor material comprises the step of positioning therein a phosphor composition additionally characterized by its said at least two wavelength ranges being sharp lines of emission each rising from substantially zero emission to a peak in less than 100 angstroms bandwidth.

11. A method of remotely measuring the temperature of an environment, comprising:
positioning an object in said environment in a manner that the object is heated by the environment,
positioning a layer of phosphor material in heat conductive relationship with said object, said phosphor being characterized by emitting, when excited, electromagnetic radiation within optically isolatable bandwidths at at least two distinct wavelength ranges and with relative intensities therein that vary as a known function of the phosphor temperature,
exciting said phosphor to cause emission of said at least two wavelength bands,
positioning a fiber optic between said phosphor to a remote measuring position in a manner to optically transfer the emitted radiation from the phosphor to the remote measuring position, and
detecting the relative intensities of said at least two distinct wavelength radiation bands at the remote end of the fiber optic bundle.

12. A method as defined by claim 11 wherein the step of exciting the phosphor includes positioning a source of electrons or other radioactive emissions adjacent to or as part of said object.

13. A method as defined by claim 11 wherein the step of exciting the phosphor includes the step of passing electromagnetic radiation in the ultraviolet range from said remote location through an optical fiber to said phosphor.

14. A method as defined by claim 11 wherein the step of positioning a phosphor material comprises the step of positioning therein a phosphor composition additionally characterized by its said at least two wavelength ranges being sharp lines of emission each rising from substantially zero emission to a peak in less than 100 angstroms bandwidth.

15. A method as defined by claim 11 wherein a plurality of such objects are positioned with their associated phosphor layers in various different locations within said environment, another fiber optic transferring the emitted radiation from each object location to the remote position, the radiation from each fiber optic being detected separately in space or time at the remote measuring position.

16. A method as defined by claim 11 wherein said environment is a piece of large equipment such as a sealed power transformer with said object positioned therewithin at a point where the temperature is to be monitored and said remote measuring position is outside said transformer.

17. A device for remotely measuring temperature, comprising:
a length of a fiber optics,
a layer of phosphor material held at one end of said fiber optics in light communication therewith, said phosphor being characterized by emitting, when excited, electromagnetic radiation within optically isolatable bandwidths at at least two distinct wavelength ranges and with relative intensities therein that vary as a known function of the phosphor temperature,
means for exciting said phosphor to cause emission of said at least two wavelength bands,
means at said one end of the fiber optics sealing the phosphor layer therewith, whereby said one end constitutes a probe that may be inserted into an environment whose temperature is to be measured,
means at an opposite end of said fiber optical bundle to filter from the phosphor emission transmitted therethrough each of said at least two distinct wavelength bands,
means for independently detecting the intensity of each of said at least two wavelength bands as received at the opposite end of the fiber optic bundle, and
means for comprising the detected intensities, whereby the temperature of said probe can be remotely determined.

18. The device of claim 17 wherein said comparison means includes means for taking a ratio of the detected phosphor wavelength band intensities.

19. The device according to claim 17 wherein said exciting means includes a source of electrons or other radioactive emissions permanently sealed within said probe in a position immediately adjacent said phosphor layer.

20. The device according to claim 17 wherein said exciting means comprises at said opposite end of the fiber optics:
   means for generating electromagnetic energy within the ultraviolet or visible range, and
   optical means for directing said ultraviolet or visible radiation through said fiber optics to its phosphor end in a manner that does not interfere with said detecting means.

21. The device according to claim 17 wherein said phosphor is additionally characterized by its said at least two wavelength ranges being sharp lines of emission each rising from substantially zero emission to a peak in less than 100 angstroms bandwidth.

22. A system for determining the temperature of an object, comprising:
   a layer of phosphor material applied to said object in intimate contact therewith, said phosphor being characterized by emitting, when excited, electromagnetic radiation within optically isolatable bandwidths at at least two distinct wavelength ranges and with relative intensities therein that vary as a known function of the phosphor temperature,
   means for exciting said phosphor material to cause emission of said at least two wavelength bands,
   means for independently detecting the intensity of radiation emitted by the phosphor material and each of said at least two wavelength bands, and
   means for comparing the detected intensities, whereby the temperature of said object can be remotely determined.

23. The system according to claim 22 wherein said phosphor is additionally characterized by its said at least two wavelength ranges being sharp lines of emission each rising from substantially zero emission on either side to a peak line intensity in less than 100 angstroms bandwidth.

* * * * *